(12) United States Patent
Zhu et al.

(10) Patent No.: US 10,818,032 B2
(45) Date of Patent: Oct. 27, 2020

(54) METHOD FOR OBJECT SIZE AND ROTATION ESTIMATION BASED ON LOG-POLAR SPACE

(71) Applicant: ZHEJIANG UNIVERSITY, Hangzhou, Zhejiang (CN)

(72) Inventors: Jianke Zhu, Zhejiang (CN); Yang Li, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 77 days.

(21) Appl. No.: 16/305,027

(22) PCT Filed: Dec. 27, 2017

(86) PCT No.: PCT/CN2017/118845
§ 371 (c)(1),
(2) Date: Nov. 27, 2018

(87) PCT Pub. No.: WO2019/029098
PCT Pub. Date: Feb. 14, 2019

(65) Prior Publication Data
US 2019/0333243 A1 Oct. 31, 2019

(30) Foreign Application Priority Data
Aug. 11, 2017 (CN) .......................... 2017 1 0685725

(51) Int. Cl.
*G06T 7/73* (2017.01)
*G06T 7/246* (2017.01)
*G06T 7/60* (2017.01)

(52) U.S. Cl.
CPC ................ *G06T 7/74* (2017.01); *G06T 7/248* (2017.01); *G06T 7/60* (2013.01); *G06T 2207/10016* (2013.01); *G06T 2207/20056* (2013.01)

(58) Field of Classification Search
CPC .. G06T 7/74; G06T 7/248; G06T 7/60; G06T 2207/10016; G06T 2207/20056;
(Continued)

(56) References Cited

U.S. PATENT DOCUMENTS

| 2004/0133427 A1* | 7/2004 | Alattar | G06T 1/0064 704/273 |
| 2008/0143857 A1* | 6/2008 | Shimizu | G06T 3/0012 348/294 |

(Continued)

OTHER PUBLICATIONS

Image Registration Using Log-Polar Mappings for Recovery of Large-Scale Similarity and Projective Transformations, Siavash Zokai, IEEE Transactions on Image Processing, vol. 14, No. 10, Oct. 2005, pp. 1422-1434 (Year: 2005).*

*Primary Examiner* — Nimesh Patel

(57) ABSTRACT

The present invention discloses a method which comprises the following steps: inputting the image waiting for test and the template; log-polar transforming the image waiting for test; performing feature extraction on transformed image object; capturing an image feature; achieving a response map of scale and rotation of the image object corresponding to a template through a phase correlation by using features extracted from the image features; calculating a relative displacement by using a response value and coordinates of the response value in a surround area of a maximum value of the response pattern; calculating the scale and the rotation of an object in the image waiting for test corresponding to the template through the relative displacement. The present invention adopts the log-polar space as the image operating space to estimate the change in size and rotation of the object and provide a fast and robust select for upper applications.

3 Claims, 3 Drawing Sheets

(58) Field of Classification Search
CPC .. G06T 7/62; G06T 7/73; G06T 3/604; G06T 7/246; G06T 2207/10004; G06T 7/11; G06T 15/02; G06T 17/00; G06T 7/292; G06T 7/70; G06T 1/0064; G06T 2201/0052; G06T 3/0012; G06T 7/33; G06T 1/20; G06T 2207/20016; G06T 2210/00; G06T 15/20; G06T 19/006; G06T 2200/24; G06T 13/40; G06T 2210/36; G06T 3/40; G06T 3/4053; G06T 5/003; G06T 5/20; G06T 2207/20081; G06T 7/0002; G06T 7/0004; G06T 1/0021; G06T 1/0028; G06T 11/60; G06T 2201/005; G06T 2207/30244; G06T 5/00; G06T 7/0012; G06T 7/37; G06T 3/0068; G06T 5/006; G06T 2207/10021; G06T 2207/10072; G06T 2207/10124; G06T 7/344; G06T 7/001; G06T 7/32; G06T 1/0007; G06T 2207/20048; G06T 7/30; G06T 7/337; G06T 7/35; G06T 7/40; G06K 9/4671; G06K 9/00; G06K 9/00208; G06K 9/00664; G06K 9/3241; G06K 9/4628; G06K 9/6202; G06K 9/6215; G06K 9/6255; G06K 9/00288; G06K 9/00597; G06K 9/4604; G06K 9/629; G06K 9/46; G06K 9/4619; G06K 9/6206; G06K 9/00711; G06K 9/00744; G06K 9/00791; G06K 9/4676; G06K 9/6269; G06K 9/228; G06K 9/00577; G06K 9/4647; G06K 2009/4666; G06K 9/52; G06K 9/6201; G06K 7/1456; G06K 9/00201; G06K 9/00127; G06K 9/0014; G06K 9/00684; G06F 16/583; G06F 16/5838; G06F 16/5866; G06F 1/3209; G06F 1/3287; G06F 11/0715; G06F 21/53; G06F 9/485; G06F 11/2273; G06F 11/3024; G06F 11/3055; G06F 12/1441; G06F 21/57; G06F 3/017; G06F 3/011; G06F 3/0346; G06F 3/04883; G06F 17/18; G06F 2203/04806; G06F 3/04845; G06F 3/0485; G06F 16/50; G06F 16/955; G06F 3/0237; G06F 16/29; G06F 16/51; G06F 16/58; G06F 3/038; G06F 3/048; G06F 3/0481; H04N 13/156; H04N 13/204; H04N 13/239; H04N 13/275; H04N 5/2224; H04N 5/23229; H04N 5/2621; H04N 5/272; A61B 2560/0431; A61B 3/111; A61B 5/055; A61B 5/14532; A61B 5/14546; A61B 5/4875; G06Q 20/18; G06Q 20/208; G06Q 20/3827; G06Q 20/389; G06Q 30/06; G06Q 20/40145; G06Q 20/1235; G06Q 30/0643; G06Q 10/08; G06Q 10/087; G06Q 20/40; G06Q 90/20; G11B 27/34; G11B 20/00884; G11B 20/00094; G11B 20/00115; G11B 20/00166; G11B 20/00181; G11B 20/00557; G11B 20/00007; G11B 20/00898; G11B 20/00913; G11B 20/00978

See application file for complete search history.

(56) References Cited

U.S. PATENT DOCUMENTS

| | | | |
|---|---|---|---|
| 2010/0014718 A1* | 1/2010 | Savvides | G06K 9/00597 |
| | | | 382/117 |
| 2011/0298824 A1* | 12/2011 | Lee | A63F 13/31 |
| | | | 345/633 |
| 2012/0134576 A1* | 5/2012 | Sharma | G06K 9/4604 |
| | | | 382/155 |
| 2016/0217577 A1* | 7/2016 | Tom | G06T 7/32 |
| 2020/0043180 A1* | 2/2020 | Chen | G06K 9/40 |

* cited by examiner

METHOD FOR OBJECT SIZE AND ROTATION ESTIMATION BASED ON LOG-POLAR SPACE

CROSS REFERENCE OF RELATED APPLICATION

This is a U.S. National Stage under 35 U.S.C 371 of the International Application PCT/CN2017/118845, filed Dec. 27, 2017, which claims priority under 35 U.S.C. 119(a-d) to CN 2017106857252, filed Aug. 11, 2017.

BACKGROUND OF THE PRESENT INVENTION

Field of Invention

The present invention relates to computer vision and image processing, and more particularly to the scale and rotation estimation of a visual object in an image sequence.

Description of Related Arts

With a development and research on the computer vision and image processing, various applications are adopted in the fields of AI (artificial intelligence), mechanical processing, transportation, entertainments, medical care, security, military and etc. Rapid and accurate estimation on the scale and rotation is a foundation of the computer vision and an important component of the applications in the visual object tracking and the object detection. The present invention provides a rapid and effective method for the scale and rotation estimation of the visual object in a sequence. As a component of object status estimation, the estimation of the scale and rotation is the foundation and premise of the image matching and etc. A capable method for the scale and rotation estimation supports and guarantees various researches.

The main task for the scale and rotation estimation method is to estimate the relative changes on the scale and rotation (two degrees of freedom in the image plane) of the visual object in input images. Similarity transformation, including translation, scale and rotation changes, is usually employed to model the relative changes. Such a comprehensive representation of the object status helps to improve the estimation of object status in various computer vision applications, such as the pedestrian detection, object detection, object tracking and etc, The scale and rotation estimation provides information on the object size and rotation besides the position coordinates, which enables a complete object status information output and an improved algorithm accuracy while matching. However, compared with pure translation estimation, the searching space is increased from 2-DOF (Degrees of Freedom) to 4-DOF.

The main stream of the scale estimation in conventional computer vision algorithm is pyramid-like searching which samples the image object of different size to form an image pyramid before being matching one by one to achieve the size estimation of the image object. Similarly, the main stream method for rotation estimation is the brute-force searching which samples from all the rotation angles before matching to achieve the rotation estimation of the image objects. Both pyramid-like and brute-force approaches involve a large amount of image sampling operation and occupie a large amount of computational resources. This limits the usage of similarity transformation in real-time applications, which has a high requirement on algorithm efficiency.

In summary, the conventional scale and rotation estimation methods are not able to be employed to support the applications which need to be both rapid and accurate.

SUMMARY OF THE PRESENT INVENTION

The present invention is to provide an efficient and effective method to estimate the scale and rotation changes of a visual object in an image sequence. The scale and rotation is obtained by comparing the feature of the visual object to the trained model in a log-polar space. According to the properties of log-polar space, only one sample is needed to estimate the scale and rotation changes at same time.

The present invention adopts the following steps:

1) inputting an image waiting for test and an image template (after log-polar transforming and feature extraction), log-polar transforming the image waiting for test; wherein both the image waiting for test and the image template contain a whole object with a known center; the size and rotation angle of the object in the image template are known;

2) performing feature extraction on transformed image object; capturing an image feature;

3) achieving a response pattern of a scale and a rotation of the image object corresponding to a template through a phase correlation by using features extracted from the image features;

4) calculating a relative displacement by using the response value and coordinates of the response value in a surround area of the maximum value of the response pattern; and 5) calculating the size and the rotation of an object in the image waiting for test corresponding to the template through the relative displacement.

wherein the origin of a log-polar transform in the step 1) is a geometric center of an object in an image. The image object is transformed from a Cartesian to a log-polar space. The relative scale and rotation change are corresponding to vertical and horizontal move in the log-polar space, which transforms the size and rotation estimation in the image domain to an offset estimation of the vertical and horizontal in log-polar coordinates.

The feature in the step 2) is image gradients.

The step 2) improves the robustness of the algorithm for the visual object in illumination variation, object deformation, pose change and etc. Performing feature extraction after the step 1) reduces the effect on transforming feature maps into the log-polar space to accurately estimates the change in rotation and size of the object.

The step 3) further comprises the following sub-steps:

3.1) calculating with a following formula:

$$R = \frac{G_a \circ G_b^*}{|G_a \circ G_b^*|}$$

wherein R denotes a response map in frequency space; $G_a$ denotes a result of a Fourier transform of the image features; $G_b$ denotes a result of a Fourier transform of the template; $G_a^*$ denotes a conjugate of the result of the Fourier transform of the image features; $G_b^*$ denotes a conjugate of the result of the Fourier transform of the template; $\circ$ is a Hadamard product;

$$G_a = \mathcal{F}\{g_a\}, G_b = \mathcal{F}\{g_b\}$$

wherein $g_a$ are image features achieved in the step 2); F is the Fourier transform; $g_b$ is the template;

3.2) Transforming the frequency response pattern R back to time domain and achieving the response pattern r by adopting a following formula:

$$r = \mathcal{F}^{-1}\{R\}$$

wherein $F^{-1}$ is an inverse Fourier transform.

The step 3) calculates the relative change of the image object corresponding to the model trained by the algorithm through the phase correlation and achieves the response map which is adopted by the step 4) to calculate the relative scale and rotation change of the visual object. The phase correlation only involves pixel by pixel multiplication, Hadamard product, in the Fourier space which eases the calculation and achieves the estimation rapidly. The change of scale and rotation are able to be accurately estimated by the convolution theorem without compromising the speed.

The template in the step 3) is a reference for estimating the relative change which is an image feature or an average of a series of image features.

When the template is the average of the series of image features, the series of image features are processed by the linear fusion which comprises the following steps: estimating the size and the rotation of the image object; re-sampling the image object, wherein the image object is aligned according to rotation values; and practicing the linear fusion by adopting the below formula:

$$g_b^{new} = \lambda g_{resample} + (1-\lambda) g_b^{old}$$

wherein $g_b^{new}$ is the template after the linear fusion; $g_b^{old}$ is the template before the linear fusion; $g_{resample}$ is the added template by the linear fusion; $\lambda$ is a learning parameter.

The step 4) further comprises the following steps: adopting the response value of the surround area of the maximum value as a weight of coordinates in the surround area of the maximum value; weighting the coordinates before subtracting the coordinates of the origin in the response map; and interpolating the coordinates to estimate the relative displacement with floating points by following processing formulas:

$$\Delta x = \frac{\sum_{(i,j)\in\Phi} r(i,j)*i}{\sum_{(i,j)\in\Phi} r(i,j) + \epsilon} - x_o$$

$$\Delta y = \frac{\sum_{(i,j)\in\Phi} r(i,j)*j}{\sum_{(i,j)\in\Phi} r(i,j) + \epsilon} - y_o$$

wherein $\Delta x$ and $\Delta y$ are the relative displacements along a vertical and a horizontal direction of an image respectively; $x_o$ and $y_o$ are coordinates along a vertical and a horizontal direction of an origin of the frequency space; the origin of the frequency space is a point whose frequency is zero in a frequency domain; (i,j) are coordinates of points in the response map; r(i,j) is an image value of (i,j) in the response map; $\Phi$ is the surround area of the maximum value, which are within two pixels range in the embodiment; there are 25 response values in the surround area of the maximum value in the embodiment; $\epsilon$ is an adjustment parameter which is a small value to prevent the dividend from being zero.

The step 4) achieves accurate relative displacement besides the discretized scale and rotation change. The consecutive displacement value enables accurate estimations on the change in the scale and rotation.

The step 5) calculates a relative change of the size of the object achieved by normalizing the displacement of the vertical and horizontal coordinates. An exponential changing is employed to normalize the scale displacement and a standard normalization is used to rotation.

The step 5) further comprises the following sub-steps: normalizing the relative displacement achieved in the step 4); calculating the variation of a relative scale and a relative rotation of the object by adopting following formulas:

$$\theta = \frac{\Delta y * 180}{h/2}$$

$$s = e^{\Delta x}$$

wherein h denotes the height of the image; $\theta$ denotes changes in rotation a variation of the rotation; s denotes a variation of the size.

The step 5) transforms and normalizes the relative displacement to multiplying change in size and angle change in rotation from displacement in the size of the image to provide the estimation which is able to be adopted by other applications.

The embodiment of the present invention adopts a system which comprises the following three modules.

1) input module for receiving the collected the image data and video series;

2) scale and rotation estimation module for analyzing the image and estimating the change in scale and rotation of the visual object corresponding to the trained model.

3) output module for outputting the estimated change in size and rotation of the object.

The present invention obtains the following benefits.

The present invention is able to estimate the scale and rotation of the image object rapidly and accurately. The size and rotation estimation are transformed to the offset estimation of the vertical and horizontal coordinates in log-polar space. With convolution theorem, the estimation only need sample once to obtain accurate result. The algorithm is robust in illumination variation and object deformation through feature extraction, which improves the effectiveness and efficiency of the algorithm and meets the requirement on real-time image processing.

DETAILED DESCRIPTION OF THE PREFERRED EMBODIMENT

Figure 1:
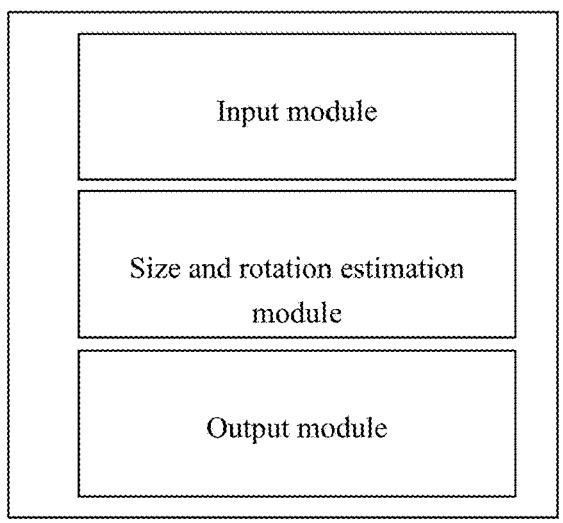
FIG. 1 is a perspective view of a structure of an algorithm of the present invention.

Referring to the drawings, according to a preferred embodiment, the present invention is illustrated completely with clarity. Any embodiment provided by a skilled worker in the field without innovation is within the protection range of the present invention.

In order to better illustrate the object and technical solution of the present invention, the embodiment of the present invention is described in details with a reference of the drawings.

The embodiment of the present invention is as below:

As illustrated in the FIG. 1, the modules in the system of the embodiment are as below:

input module for receiving the collected the image data and video series;

wherein the inputs are sent to the scale and rotation estimation module for estimation;

scale and rotation estimation module for log-polar transforming the received images; performing the feature extraction on the images in the new coordinate system; performing phase correlation; estimating the scale and rotation of the visual object in the image corresponding to the model template by comparing with the trained model in the algorithm; and sending the scale and rotation estimation to the output model.

output module for displaying the scale and rotation estimation; marking the object status estimated by the scale and rotation estimation module on the corresponding positions in the original image.

Figure 2:
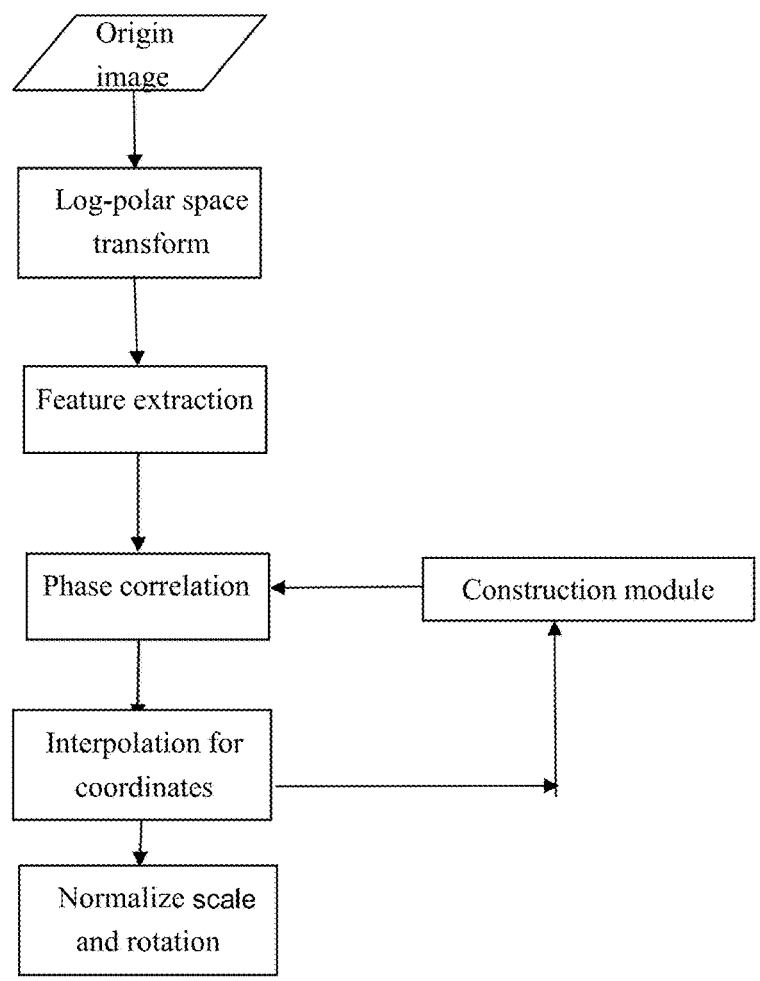
FIG. 2 is a flow chart of the present invention.
Figure 3:
FIG. 3 is a comparison between coordinates and log-polar coordinates in an image for test in an embodiment.

As illustrated in the FIG. 2, the scale and rotation estimation module mainly computes the scale and rotation estimation in the image of the present invention; wherein the center position of the visual object is known to the algorithm, which is able to be achieved by an object detector or an object tracker. All aligned input image patch is sampled in a bit larger than the object size to ensure all visual object is included in the patch. The patch needs to be resized to a fixed size with the same size of template. The estimation comprises the following steps:

1) Log-polar transforming the inputted image. The formula for transforming the image coordinates to log-polar coordinates is as follow:

$$\begin{cases} \rho = \log\sqrt{x^2 + y^2}, \\ \theta = \arctan y/x \text{ if } x > 0. \end{cases}$$

wherein $\rho$ denotes the coordinate of the logarithmic distance; $\theta$ denotes the angular coordinate; x and y are the coordinates in the Cartesian coordinate system. The origin of the coordinates is aligned to the center of the visual object before transforming the coordinate system; wherein $x = x^{image} - x_0$, $y = y^{image} - y_0$. The FIG. 3 is a comparison between original coordinates and log-polar coordinates of an image.

2) Performing feature extraction on the image achieved in the step 1) in the log-polar coordinate system; wherein the embodiment extracts Histogram of Gradient (HoG) feature; the original image pixel and the deep learning feature are able to be adopted in other embodiments.

3) Achieving the response map of the scale and the rotation of the image object corresponding to the algorithm model by phase correlation; wherein the formula for the phase correlation is as below:

$$R = \frac{G_a \circ G_b^*}{|G_a \circ G_b^*|}$$

-continued $$G_a = \mathcal{F}\{g_a\}, G_b = \mathcal{F}\{g_b\}$$

wherein $g_a$ is the image feature in the step 2); F denotes the Fourier transform; $g_b$ is the trained model in the algorithm; $\circ$ is the Hadamard product Transforming the frequency response map R back to time domain as the response pattern r by adopting a following formula:

$$r = \mathcal{F}^{-1}\{R\}$$

wherein $F^{-1}$ is an inverse Fourier transform.

The model template is the reference for estimating the relative change required by the algorithm, which can be in various forms, such as a reference image feature or an average of a series of image features. In the present embodiment, the model template is the linear fusion for all images tested by the preceding algorithm which comprises the following steps: estimating the scale and rotation of the image object; re-sampling the image object aligning the model template according to the estimated scale and rotation parameters; processing the image object according to the step 1) and the step 2); and performing linear fusion with the current model by adopting the following formula:

$$g_b^{new} = \lambda g_{resample} + (1-\lambda)g_b^{old}$$

wherein $g_b^{new}$ is the template after the linear fusion; $g_b^{old}$ is the template before the linear fusion; $g_{resample}$ is the added sample by the linear fusion; $\lambda$ is a learning parameter.

4) Calculating the relative displacement by the response value in the surrounding area of the maximum value in the responding map; wherein the maximum value is always in the discrete index position and requires interpolation in the coordinates to achieve the floating-point displacement value by following processing formulas:

$$\Delta x = \frac{\sum_{(i,j) \in \Phi} r(i,j) * i}{\sum_{(i,j) \in \Phi} r(i,j) + \epsilon} - x_o$$

$$\Delta y = \frac{\sum_{(i,j) \in \Phi} r(i,j) * j}{\sum_{(i,j) \in \Phi} r(i,j) + \epsilon} - y_o$$

wherein $\Delta x$ and $\Delta y$ are the relative displacements; $x_0$ and $y_0$ are coordinates of the origin of the image; (i,j) are coordinates in the response map; $\Phi$ is the surround area of the maximum value, which are within two pixels range in the embodiment; there are 25 response values in the surround area of the maximum value; $\epsilon$ is an adjustment parameter which is a small value to prevent the dividend from being zero.

5) Calculating the change in scale and rotation of the object through relative displacement, wherein the change in relative scale and rotation is achieved by adopting the following formula through normalizing the relative displacement achieved in the step 4).

$$\theta = \frac{\Delta y * 180}{h/2}$$

$$s = e^{\Delta x}$$

wherein h denotes the height of the image; θ denotes the change in the rotation; s denotes the change in the scale.

Figure 4:
FIG. 4 is a perspective view of results on data of the embodiment.

The FIG. 4 is a perspective view the result. Each line demonstrates a performing process in sequence, which proves the algorithm is able to accurately estimate the change in rotation and scale. The first column shows the template in the embodiment of the present invention and the rest four columns show the specific estimation. The gray quadrilateral box shows estimation result.

The FIG. 4 shows the present invention is able to estimate the scale and rotation of the object in various scenarios and the gray quadrilateral box always precisely contains the visual object.

The present invention is tested on the OTB100 (Object Tracking Benchmark) which is a standard benchmark in the field. The present invention is compared with fDSST (fast Discriminative Scale Space Tracking) and SAMF (Scale Adaptive Kernel Correlation Filter) after being embedded in the KCF (Kernel Correlation Filter). The test result is compared with the ground truth of the test set to draw the overlap rate curve and the error rate curve which is a standard for judging the performance of the algorithm.

The OTB100 contains 100 video sequences and rich annotation information. As illustrated in the FIG. 5, the present invention improves the accuracy by 6-9% compared with conventional fDSST.

Figure 5:
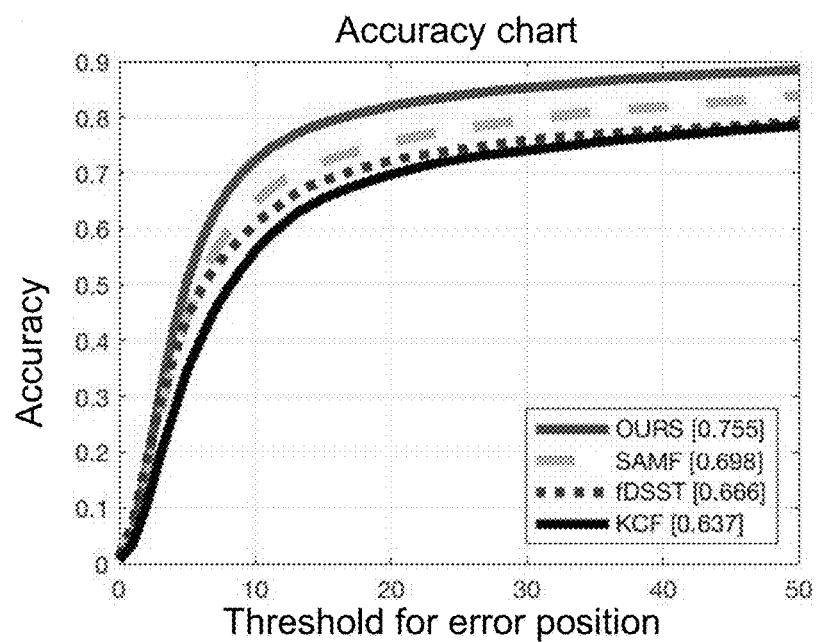
FIG. 5 is a perspective view of an accurate rate on OTB100 (Object Tracking Benchmark) of the embodiment.

As illustrated in the FIG. 5, the present invention significantly progresses ahead of the conventional algorithm judging by the overlap rate curve and the error rate curve, which demonstrates a robustness of the present invention under various scenarios.

FIG. 5 is a perspective view of the accurate rate of the OTB100. The horizontal coordinate is an error distance between the center of the object and the labeled center. The vertical coordinate represents the percentage within a certain error distance. The FIG. 5 shows that the present invention is better than the conventional methods within various error ranges and is robust.

Figure 6:
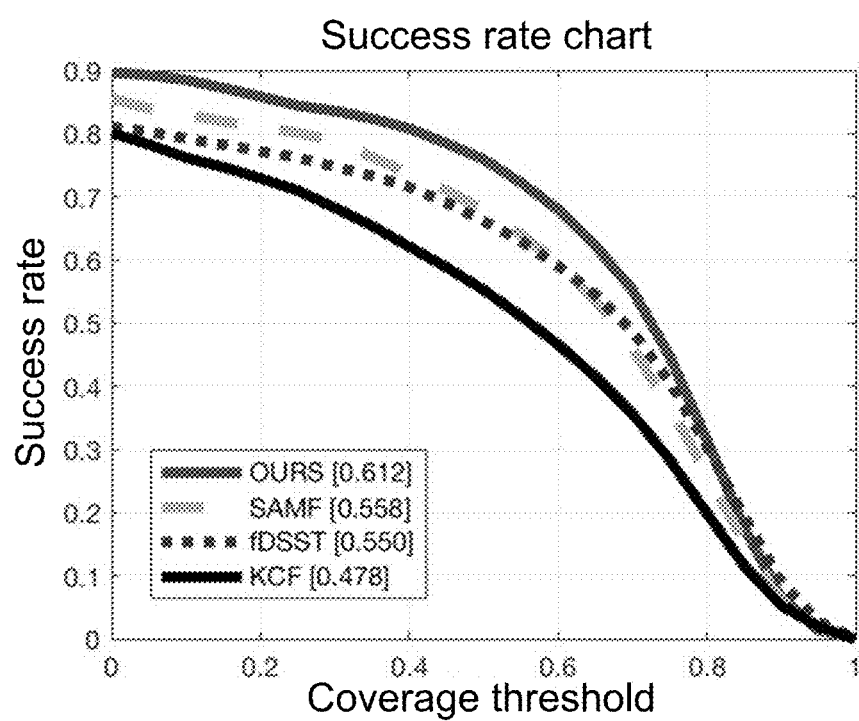
FIG. 6 is a perspective view of a success rate on OTB100 (Object Tracking Benchmark) of the embodiment.

The FIG. 6 shows the success rate of the OTB100. The horizontal coordinate is the overlap threshold. The vertical coordinate is the success rate. The FIG. 6 demonstrates that the present invention is superior in performance.

The test result shows that the present invention outperforms the conventional algorithms for scale and rotation estimation.

The embodiment is just an example to illustrate the present invention. The embodiment is not a limitation for the present invention which has other variations. Any alteration and modification on the embodiment without innovation are within the protection range of the present invention. The protection range of the present invention is the maximum range covered by the claims.

What is claimed is:

1. A method estimating scale and rotation changes of a visual object in a sequence based on log-polar space, comprising steps of:
   1) inputting an image waiting for test and an image template, log-polar transforming the image waiting for test;
   2) performing feature extraction on a transformed image; capturing an image feature;
   3) achieving a response map of a scale and a rotation of the image object corresponding to a template through a phase correlation by using features extracted from the image feature;
   4) calculating a relative displacement by using a response value and coordinates of the response value in a surround area of a maximum value of the response map; and
   5) calculating the scale and the rotation of an object in the image waiting for test corresponding to the template through the relative displacement; wherein the step 3) further comprises the following sub-steps of:
   3.1) calculating with a following formula:

$$R = \frac{G_a \circ G_b^*}{|G_a \circ G_b^*|}$$

wherein R denotes a response map in frequency domain; $G_a$ denotes a result of a Fourier transform of the image features; $G_b$ denotes a result of a Fourier transform of the template; $G_a^*$ denotes a conjugate of the result of the Fourier transform of the image features; $G_b^*$ denotes a conjugate of the result of the Fourier transform of the template;

$$G_a = \mathcal{F}\{g_a\}, G_b = \mathcal{F}\{g_b\}$$

wherein $g_a$ are image features achieved in the step 2); F is the Fourier transform; $g_b$ is the template; ∘ is a Hadamard product; and
   3.2) transforming the frequency response map R back to time domain and achieving the response pattern r by adopting a following formula:

$$r = \mathcal{F}^{-1}\{R\}$$

herein $F^{-1}$ is an inverse Fourier transform.

2. A method estimating scale and rotation changes of a visual object in a sequence based on log-polar space, comprising steps of:
   1) inputting an image waiting for test and an image template, log-polar transforming the image waiting for test;
   2) performing feature extraction on a transformed image; capturing an image feature;
   3) achieving a response map of a scale and a rotation of the image object corresponding to a template through a phase correlation by using features extracted from the image feature;
   4) calculating a relative displacement by using a response value and coordinates of the response value in a surround area of a maximum value of the response map; and:
   5) calculating the scale and the rotation of an object in the image waiting for test corresponding to the template through the relative displacement; wherein the step 4) further comprises the following steps: adopting the response value of the surround area of the maximum value as a weight of coordinates in the surround area of the maximum value; weighting the coordinates before subtracting the coordinates of the origin in the response map; and interpolating the coordinates to estimate the relative displacement with floating points by following processing formulas:

$$\Delta x = \frac{\sum_{(i,j)\in\Phi} r(i,j)*i}{\sum_{(i,j)\in\Phi} r(i,j)+\epsilon} - x_o$$

-continued $$\Delta y = \frac{\sum_{(i,j)\in\Phi} r(i,j)*j}{\sum_{(i,j)\in\Phi} r(i,j)+\epsilon} - y_o \quad 5$$

wherein $\Delta x$ and $\Delta y$ are the relative displacements along a vertical and a horizontal direction of an image respectively; $x_o$ and $y_o$ are coordinates along a vertical and a horizontal direction of an origin of the frequency space; the origin of the frequency space is a point whose frequency is zero in a frequency domain; (i,j) are coordinates of points in the response map; r(i,j) is an image value of (i, j) in the response map; $\Phi$ is the surround area of the maximum value; $\epsilon$ is an adjustment parameter.

3. A method estimating scale and rotation changes of a visual object in a sequence based on log-polar space, comprising steps of:

1) inputting an image waiting for test and an image template, log-polar transforming the image waiting for test;
2) performing feature extraction on a transformed image; capturing an image feature;
3) achieving a response map of a scale and a rotation of the image object corresponding to a template through a phase correlation by using features extracted from the image feature;
4) calculating a relative displacement by using a response value and coordinates of the response value in a surround area of a maximum value of the response map; and
5) calculating the scale and the rotation of an object in the image waiting for test corresponding to the template through the relative displacement; wherein the step 5) further comprises the following sub-steps: normalizing the relative displacement achieved in the step 4); calculating a variation of a relative scale and a relative rotation of the object by adopting following formulas:

$$\theta = \frac{\Delta y * 180}{h/2}$$

$$s = e^{\Delta x}$$

wherein h denotes a height of the image; $\theta$ denotes a variation of the rotation; s denotes a variation of the size.

* * * * *